US009658871B2

(12) United States Patent
Adogla et al.

(10) Patent No.: US 9,658,871 B2
(45) Date of Patent: *May 23, 2017

(54) PROVIDING CONFIGURABLE BOOTSTRAPPING OF SOFTWARE EXECUTION

(71) Applicant: Amazon Technologies, Inc., Reno, NV (US)

(72) Inventors: Eden G. Adogla, Seattle, WA (US); Kevin A. Tegtmeier, Seattle, WA (US); Adam K. Loghry, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 203 days.

This patent is subject to a terminal disclaimer.

(21) Appl. No.: 14/553,615

(22) Filed: Nov. 25, 2014

(65) Prior Publication Data
US 2015/0082310 A1 Mar. 19, 2015

Related U.S. Application Data

(63) Continuation of application No. 13/112,914, filed on May 20, 2011, now Pat. No. 8,914,626.

(51) Int. Cl.
*G06F 9/455* (2006.01)
*G06F 9/44* (2006.01)
*G06F 9/445* (2006.01)

(52) U.S. Cl.
CPC ........ *G06F 9/45533* (2013.01); *G06F 9/4401* (2013.01); *G06F 9/441* (2013.01); *G06F 9/44505* (2013.01)

(58) Field of Classification Search
None
See application file for complete search history.

(56) References Cited

U.S. PATENT DOCUMENTS 6,810,478 B1 10/2004 Anand et al.
2006/0089992 A1 4/2006 Blaho
(Continued)

OTHER PUBLICATIONS

"CernVM contextualization on Amazon EC2 (or API compatible) Cloud," retrieved on Feb. 28, 2011, from https://cernvm.cern.ch/project/tract/cernvm/wiki/EC2Contextualization, 4 pages.
(Continued)

*Primary Examiner* — Kim Huynh
*Assistant Examiner* — Paul J Yen
(74) *Attorney, Agent, or Firm* — Seed IP Law Group LLP

(57) ABSTRACT

Techniques are described for facilitating execution of software programs in a configurable manner, including to configure bootstrapping operations that are performed at startup of the software programs. At least some of the software programs may be software images that each include, for example, a defined file system, an operating system, and one or more application programs. In addition, configuration of the software programs' startup may include using distinct bootstrap packages that each include their own distinct file system, such that loading of a bootstrap package within a software image includes adding the included file system of the bootstrap package to a new location within the defined file system of the software image (e.g., by mounting the included file system of the bootstrap package within the defined file system of the software image, and optionally removing the included file system of the bootstrap package after bootstrapping operations are completed).

23 Claims, 9 Drawing Sheets

(56) References Cited

U.S. PATENT DOCUMENTS

| | | |
|---|---|---|
| 2007/0005615 A1 | 1/2007 | Dodge |
| 2007/0044077 A1 | 2/2007 | Srivastava et al. |
| 2008/0270583 A1 | 10/2008 | Gonzalez et al. |
| 2011/0078680 A1 | 3/2011 | Lagergren et al. |

OTHER PUBLICATIONS

"CloudInit," retrieved on Feb. 28, 2011, from https://help.ubuntu.com/community/CloudInit?action=print, 6 pages.

Tozzi, C., "Ubuntu's Cloud-Init Promotes Customization in the Cloud," Jan. 5, 2011, retrieved on Feb. 28, 2011, from http://www.talkincloud.com/ubuntus-cloud-init-promotes-customization-in-the-cloud/, 3 pages.

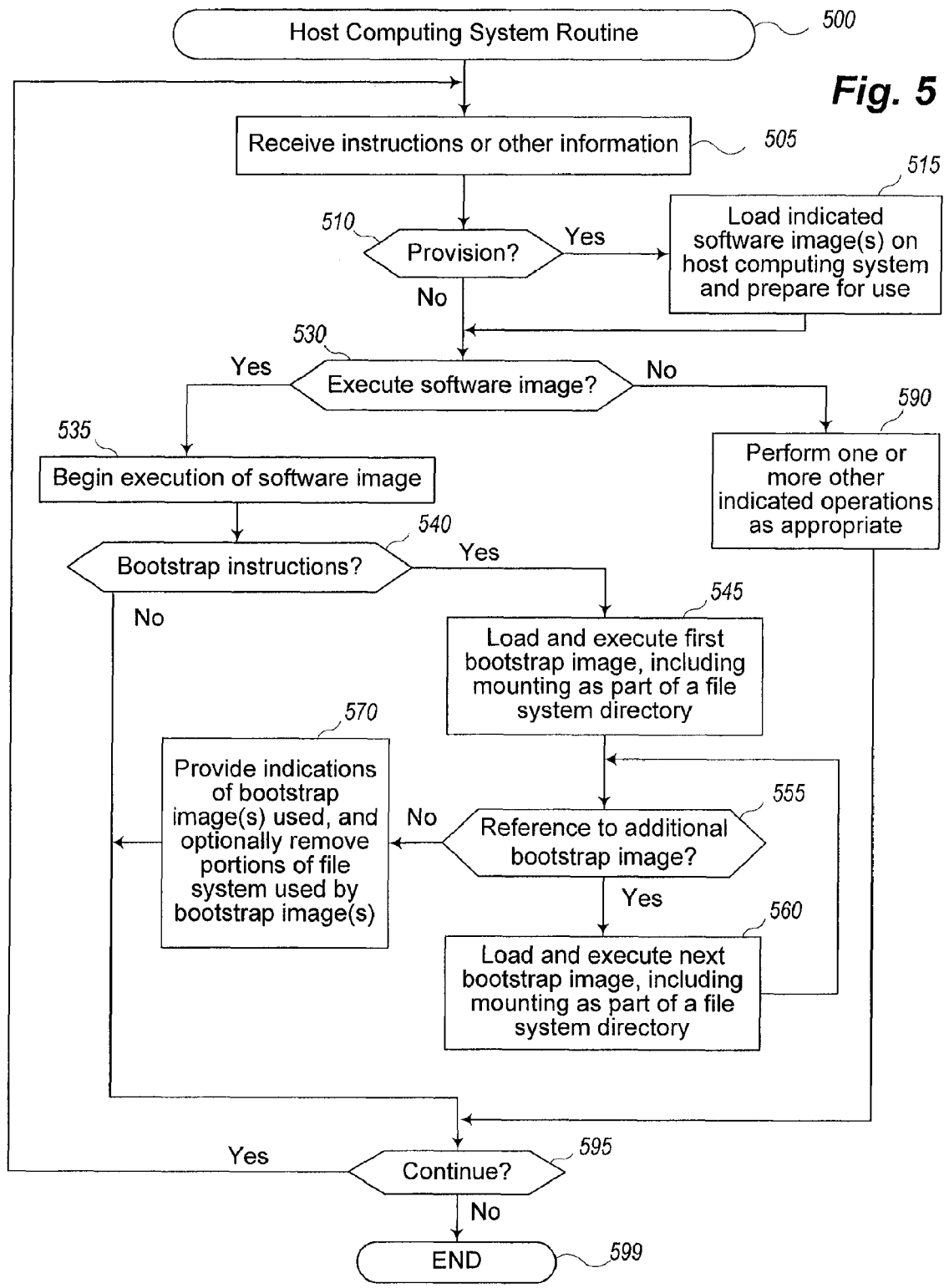

PROVIDING CONFIGURABLE BOOTSTRAPPING OF SOFTWARE EXECUTION

BACKGROUND

Data centers housing significant numbers of interconnected computing systems have become commonplace, such as private data centers that are operated by and on behalf of a single organization, and public data centers that are operated by entities as businesses to provide computing resources to customers. For example, some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIG. 5 is a flow diagram of an example embodiment of a Host Computing System routine.

DETAILED DESCRIPTION

Figure 1A:
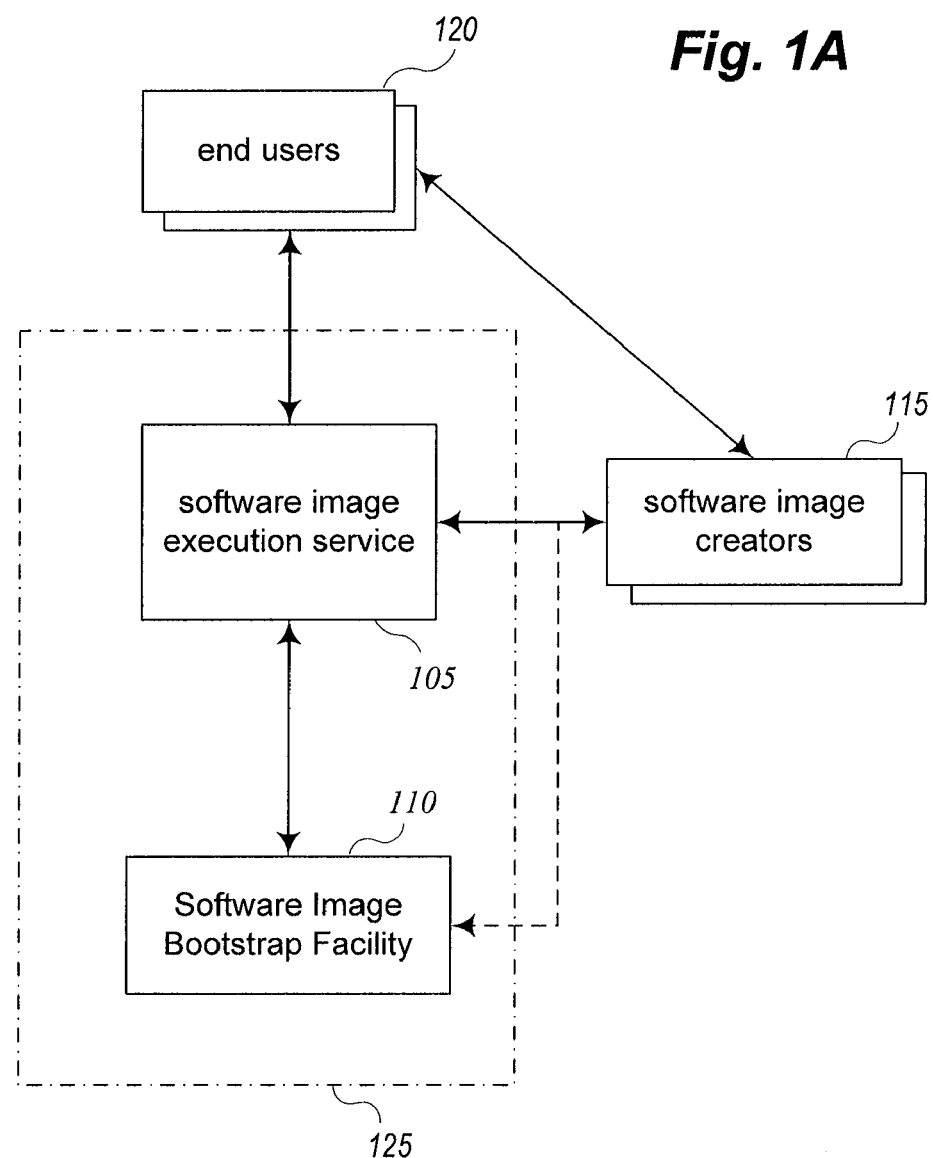
FIGS. 1A-1C illustrate examples of interactions to facilitate bootstrapping of executable software images.

Techniques are described for facilitating execution of software programs in a configurable manner, including to configure bootstrapping operations that are performed at startup of the software programs in order to provide various initialization and/or configuration activities for the software programs. In at least some embodiments, at least some of the software programs being executed are software images that may each include, for example, one or more of a defined file system, an operating system, and one or more application programs. In addition, the configuration of the startup of the software programs may include using distinct bootstrap packages that each include their own distinct file system, such that loading of a bootstrap package within a software image includes adding the included file system of the bootstrap package to a new location within the defined file system of the software image (e.g., by mounting the included file system of the bootstrap package at a specified location within the defined file system of the software image, and optionally removing the included file system of the bootstrap package after its bootstrapping operations are performed). Furthermore, the executable software images may be virtual machine images (e.g., images that are bootable or otherwise loadable by a virtual machine hosted on a physical computing system) in at least some embodiments, such that the execution of such a software virtual machine image includes loading that software virtual machine image on a hosted virtual machine, and some or all of the bootstrap packages may also optionally be virtual machine images that are loaded within another loaded software image. Additional details related to facilitating the configurable execution of executable software images and other software programs are included below.

In at least some embodiments, some or all of the described techniques are performed by an execution service, such as a software image execution service that executes software images for users of the service in exchange for fees. In such embodiments, an end user of the software image execution service may provide his or her own software image and then execute that provided software image within the software image execution service, such as in exchange for fees charged by the software image execution service. Alternatively, some or all of the software images that are executed by end users may be registered with the software image execution service or otherwise made available in a fee-based manner by other software image creator users who create the software images, such that execution of such a fee-based software image by the software image execution service on behalf of an end user other than the software image creator user is performed in exchange for fees from the end user as defined by the software image creator user. The software image creator user may further receive at least some of the fees paid by the end user in at least some embodiments and situations, such as at least some of a difference between the fees paid by the end user and fees charged by the software image execution service for the execution.

In a similar manner, some or all of the bootstrap packages that are used may be made available in a fee-based manner by bootstrap package creator users who create and provide the bootstrap packages, such that use of such a fee-based bootstrap package by an execution service on behalf of an end user other than the bootstrap package creator user is performed in exchange for fees from the end user as defined by the bootstrap package creator user. Thus, the software image creator users, bootstrap package creator users and end users who request software image execution may in at least some embodiments and situations all be distinct, while in other embodiments and situations a particular user may perform any two of the three roles (e.g., may define and use his or her own bootstrap package for his or her execution of a software image from a third party vendor) or may perform all three of the roles. As with the software image creator users, the bootstrap package creator users may further receive at least some of the fees paid by other end users in at least some embodiments and situations, such as at least some of a difference between the fees paid by the other end users and fees charged by the execution service for the execution. In addition, bootstrap package creator users may make created bootstrap packages available for use by registering their bootstrap packages with a bootstrap facility that is part of or otherwise affiliated with the execution service, as described in greater detail below.

Figure 1B:
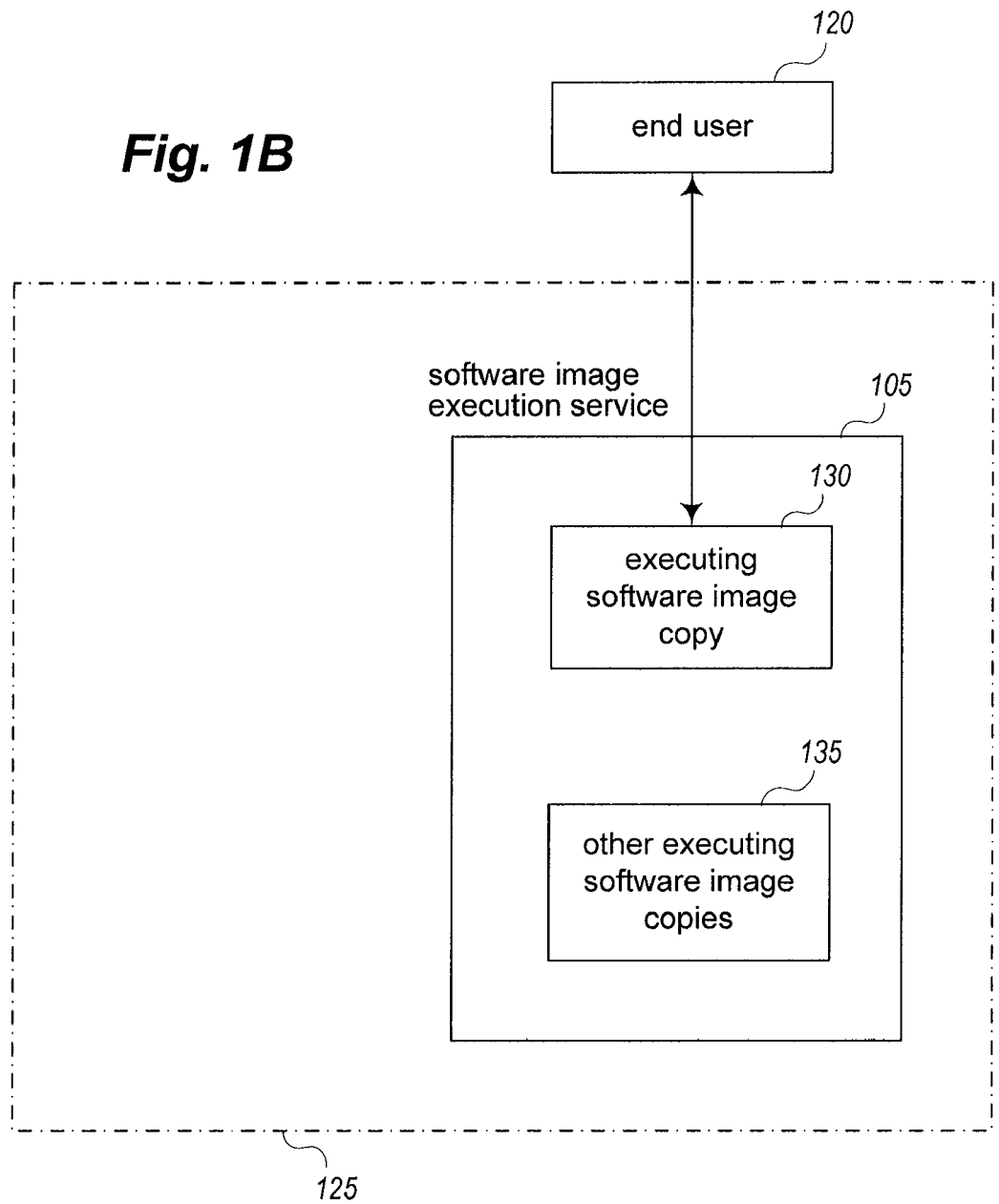
Figure 1C:
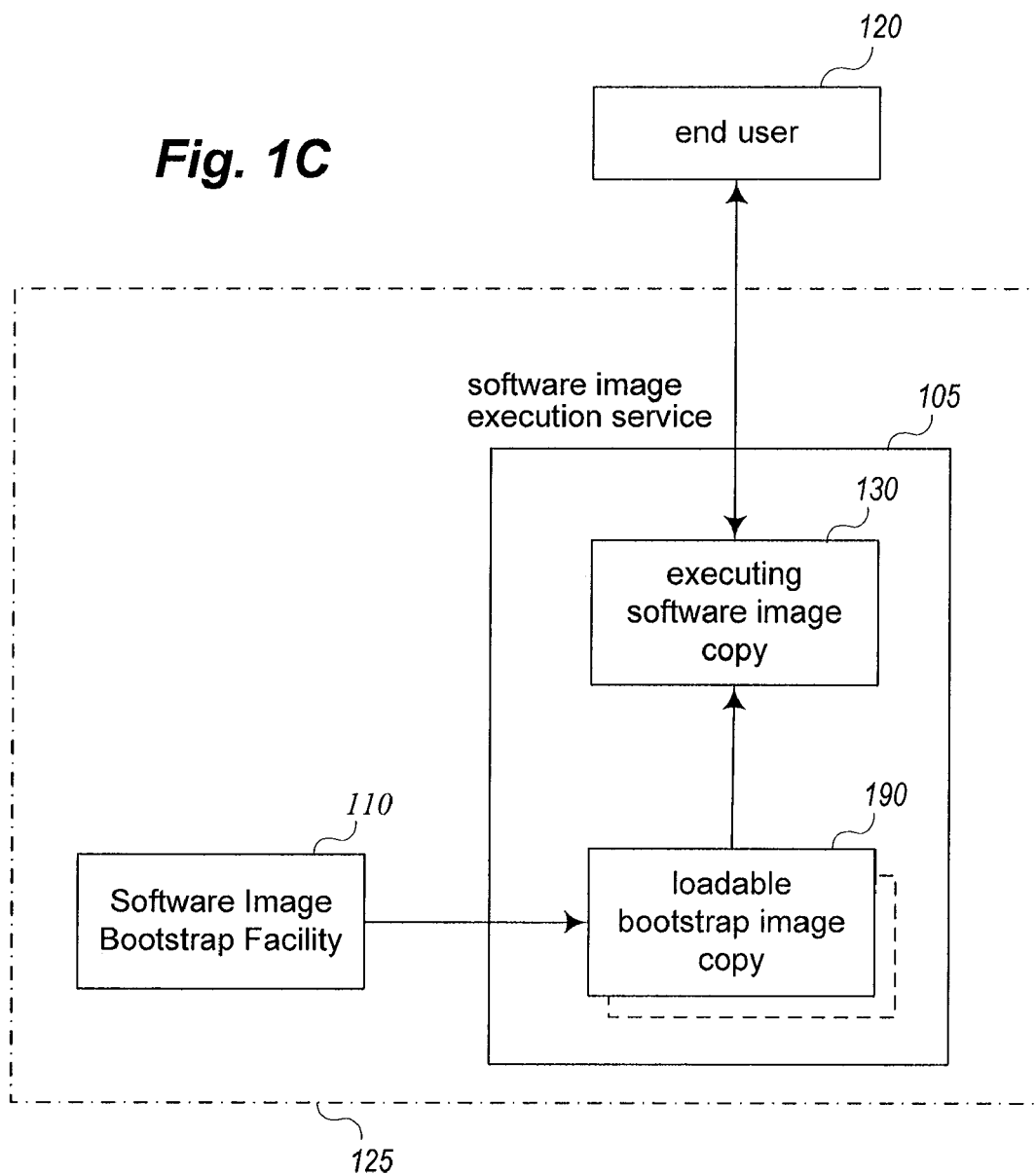

FIGS. 1A-1C illustrate examples of interactions to facilitate bootstrapping of executable software images, such as by performing various configurations at startup of the executable software images. For illustrative purposes, some embodiments are described below in which specific embodiments of the software execution service provide various specific types of capabilities with respect to various specific types of software programs, including to execute software images and to use distinct bootstrap images to configure the startup of those software images, as well as to use file systems of the software images and bootstrap images in particular specified manners. However, it will be appreciated that the described techniques may be used in a wide variety of other situations, including with other types of software programs, with other types of bootstrap packages, etc., and that the invention is not limited to the exemplary details provided.

FIG. 1A illustrates an example of interactions in which software image creator users create and provide various software images for use by others, and in which end users subsequently execute those software images. As described in greater detail below, some or all of the software images may each have one or more associated fees, and optionally may also have one or more associated non-fee use conditions as part of a usage model configured for the software image. In this example, the software images are executed by one or more commercial fee-based software image execution services that execute software images on behalf of end users. In particular, one or more service providers (not shown) each offers a software image execution service 105 that is available to execute software images for users, with each software image execution service having defined pricing terms (not shown) for software image execution, such as an indicated use price for an indicated amount of use with respect to an indicated use dimension, optionally reflecting an amount of computing resources used by the software image when executing. Such indicated use prices may, for example, include one or more of the following: an indicated price for each use of a software image; an indicated price per amount of time of use; an indicated price per unit of processing time; an indicated price per unit of storage used; an indicated price per unit of data transferred in; an indicated price per unit of data transferred out; an indicated price for a predetermined number of times of use in a predetermined period of time, etc. While not illustrated here, each software image execution service 105 may also include one or more programmed computing systems that manage the functionality of the software image execution service, and may further include a plurality of host computing systems used to execute software images for users—some or all of the host computing systems may, for example, each host one or more virtual machines that each is configurable to execute an indicated software image for a particular end user.

Thus, in the illustrated embodiment, at least some of the software image creators 115 may create and register software images (not shown) with one or more particular software image execution services 105, such that end users 120 of such a software image execution service 105 may subsequently execute those software images via that software image execution service 105. In other embodiments, the created software images may be made available to end users 120 in other manners, such as by a particular software image creator providing a particular created software image to a particular end user (e.g., in exchange for a fee from the end user to the software image creator), and by that particular end user subsequently supplying that software image to a software image execution service 105 for execution on behalf of the end user (e.g., in exchange for a fee from the end user to the software image execution service for performing the execution).

In addition, the software image execution services may further offer startup configuration services to end users to automatically configure executed software images at startup in accordance with specified startup instructions, including to use specified bootstrap images—such startup configuration services may further be provided by a software image execution service in exchange for one or more fees in at least some situations, including fees charged by the software image execution service for providing the startup configuration services and/or fees charged for the use of one or more particular specified bootstrap images by the providers of those bootstrap images. Thus, at least some of the software image creators 115 may create and register bootstrap images (not shown) with a software image bootstrap facility 110, such that end users 120 of a software image execution service 105 may subsequently request to use those bootstrap images to automatically configure their software images being executed via that software image execution service 105, and with the software image bootstrap facility 110 providing the bootstrap images to the software image execution service 105 or otherwise making them available (e.g., storing the bootstrap images in a network-accessible storage location or within a network-accessible storage service, not shown, to enable their retrieval by a software image execution service or end user when they are to be used. The software image creators 115 that create and provide the bootstrap images may be the same as or distinct from the software image creators 115 that create and provide the software images being executed. In other embodiments, the creators 115 of bootstrap images may instead interact directly with a software image execution service 105 to register or otherwise provide their bootstrap images, without interacting with an intermediate bootstrap facility. As another alternative, the provider of a software image execution service 105 may in some situations be the same entity that provides the software image bootstrap facility, such as if the software image bootstrap facility is part of a larger system 125 that includes the software image execution service or if the software image bootstrap facility is otherwise affiliated with the software image execution service, while in yet other situations a single software image bootstrap facility may provide registered bootstrap images to multiple software image execution services provided by third-party entities. In other embodiments, the created bootstrap images may be made available to end users 120 in other manners, such as by a particular software image creator providing a particular created bootstrap image to a particular end user (e.g., in exchange for a fee from the end user to the software image creator), and by that particular end user subsequently supplying that bootstrap image to a software image execution service 105 for use with a software image to be executed on behalf of the end user (e.g., in exchange for a fee from the end user to the software image execution service for performing startup configuration services using that bootstrap image).

In some embodiments, a software image creator receives a software image key for use with a registered software image or registered bootstrap image that he/she creates, to enable later tracking of the use of that registered image. The software image creator may also receive one or more URLs ("Uniform Resource Locator") or other information to use to direct end users to the software image execution service at which the software image is registered or via which the bootstrap image is accessible, to enable the end users to perform activities regarding obtaining access to the software image or bootstrap image. The software image creator may associate the software image key with the software image or bootstrap image in various ways, such as by configuring the software image or bootstrap image to use the software image key when executing, or instead the software image execution service or software image bootstrap facility may associate the software image key with the registered software image or bootstrap image. After a software image creator 115 creates a software image and configures any usage models for it, an end user 120 may decide to execute the created software image, such as by purchasing or otherwise acquiring access to the software image by interacting with the software image execution service or instead in other manners (e.g., by interacting with the software image creator's Web site, not shown), including in some situations by providing contact and payment information. The end user then receives a user token for use in initiating execution of the software image in some embodiments. After the user token is used to configure an executing copy of the software image for that end user, such as based on obtaining a corresponding user credential, the end user 120 may use the executing software image copy to obtain functionality provided by the execution. In a similar manner, after a software image creator 115 creates a bootstrap image and configures any usage models for it, an end user 120 may decide to use the created bootstrap image to configure a software image to be executed, such as by purchasing or otherwise acquiring access to the bootstrap image by interacting with the software image execution service or instead in other manners (e.g., by interacting with the software image creator's Web site, not shown; by interacting with the software image bootstrap facility; etc.). The end user 120 then interacts with the software image execution service 110 to request use of the created bootstrap image, such as by providing bootstrap instructions for use with a software image to be executed for the end user.

FIG. 1B illustrates an example of interactions between an end user, a software image copy executing via a selected software image execution service, and the software image execution service. In particular, in this example, an end user 120 is interacting with an executing software image copy 130, such as a software image created by one of the software image creator users 115 of FIG. 1A and provided to the end user by the one software image creator or other software image provider (e.g., the selected software image execution service 105 or other distributor of the software image). In this example, the software image copy 130 is associated with a software image key (not shown) based on prior configuration of one or more usage models via the software image execution service 110 for the software image, and has been configured based on a user token (not shown) for the end user in order to obtain a corresponding user credential, such as previously described with respect to FIG. 1A. The software image execution service may also simultaneously be executing other software image copies 135 for other users of the software image execution service.

The executing software image copy 130 provides various functionality to the end user 120, and one or more bootstrap images may further be used on behalf of the end user to bootstrap the execution of the software image by performing various types of configuration activities. In particular, as shown in FIG. 1C, one or more loadable bootstrap image copies 190 have been previously registered with the software image bootstrap facility 110 and provided for use with the executing software image copy 130, such as by loading and executing those one or more bootstrap image copies 190 as part of the executing software image copy 130. As described in greater detail below, in some embodiments the bootstrap image copies 190 may include a chain of multiple bootstrap images that are applied in a particular order, optionally in accordance with particular conditional logic. In addition, prior to, during and/or after execution of the software image copy 130, the software image execution service 105 may perform operations to verify that the end user 120 is authorized to execute the software image and/or to track an amount of use of the software image execution service by the executing software image copy, such as by tracking particular activities and associating them with the software image key for the software image and a user token and/or user credential for the end user. Various types of information may be tracked, such as information regarding the amount of use of the service 105 with respect to one or more use dimensions specified in a predefined usage model for the software image. Similarly, if the executing software image copy uses one or more bootstrap images, the software image key and user information for the software image copy and/or a software image key for the bootstrap image may be tracked, to enable usage-based fees to be charged for use of the bootstrap image. Furthermore, in at least some embodiments, any such bootstrap images used by the executing software image copy 130 may initiate interactions with the software image execution service 110 to indicate the use of the bootstrap image by the executing software image copy 130 on behalf of the end user 120 and/or to verify that use of the bootstrap image is currently authorized (e.g., by providing a software image key for the bootstrap image, the software image key for the software image, a received user credential, etc.), such as to enable bootstrap image use metering capabilities of the software image execution service.

Verification that an end user is authorized to execute the software image and/or use a bootstrap image on behalf of the end user may be performed in various ways in various embodiments. For example, verification or authentication may include verifying that the user credential (or user token) is currently valid, that the software image key(s) is valid, and that use restrictions (if any) that are associated with any usage models for the software image or bootstrap images are satisfied. The verification functionality may further include retrieving information about the software image, bootstrap image(s) and end user to determine whether the access is authorized, such as by retrieving information regarding any configured usage models for the software image and/or bootstrap image(s), and any subscription information for the end user. In at least some embodiments, a user credential (or user token) may be revoked or expire for various reasons, such as the end user canceling a subscription to a software image, payment not being obtained for use of a service, a predefined life of the user credential being reached (e.g., based on a specified time-to-live value), etc. In those embodiments, software image execution access verification may occur each time that execution is initiated of a software image and/or periodically during execution of a software image, and bootstrap image authentication may occur each time that a bootstrap image is used. In other embodiments, some or all initiated executions of a software image and/or bootstrap image may not be individually verified (or may only be partially authenticated, such as by only verifying the user token or user credential), such as subsequent execution initiations of a software image on behalf of a user within a predetermined period of time.

Fees to be charged to an end user for the use of one or more software images and/or bootstrap images may be determined when appropriate (e.g., once a month, for each usage, after a predetermined amount of fees are owed, when canceling a subscription, etc.). The determination of such fees may include retrieving information about the configured usage model(s) specified for use with the software images and/or bootstrap images. Other fees (e.g., recurring software image use fees, or fees paid by the end user to the software image execution service) may also be determined and added to the fees owed by the end user based on the usage. Payment may be obtained using supplied payment information from the end user. If obtaining payment is not successful, in some embodiments various remedial actions are taken, such as contacting the end user to obtain alternative payment information and/or to prevent future access to use the software images and/or bootstrap images (e.g., by revoking the user credential or the user token so that it will no longer be authenticated or verified).

After receiving payment of fees from the end user, the software image execution service may allocate the fees received between the creator of the software image and the creators of any bootstrap images, and initiate payment of the allocated amounts to the parties. In at least some embodiments, the software image execution service may also allocate at least some of the fees to itself for the functionality that it provides, and if so the net proceeds received by the software image creator(s) may be reduced appropriately.

Thus, bootstrap images may be used by a software image execution service to perform startup configuration activities for independent software images, such as described with respect to the examples of FIGS. 1A-1C, and other types of bootstrap packages may similarly be used by other execution services to perform startup configuration activities for other types of software in other embodiments.

As previously noted, the startup configuration of a particular software image or other software program may in some embodiments be based on bootstrap instructions or other startup instructions that are specified for use with the software image or other software program, such as by a user on whose behalf the software image or other software program is to be executed. Such bootstrap instructions or other startup instructions may be specified in various manners in various embodiments, such as by using a script or other software that is executable by the operating system being used for the execution of the software image or other software program (e.g., an operating system that is included as part of the software image). Furthermore, if the script or other software is specified in a scripting language that is used by multiple different types of operating systems (e.g., Perl, shell script, AWK, sed, etc.), those bootstrap instructions or other startup instructions may be used in with such operating systems. Furthermore, in at least some embodiments, the operating system being used to execute a software image or other software program may include a bootstrapper or other installer component that detects the presence of any bootstrap instructions or other startup instructions and automatically executes those instructions, such as based on including a system startup script or service within the operating system. Such a bootstrapper or other installer component may further be designed or configured in at least some embodiments to support additional types of activities, such as to decrypt a bootstrap image or other bootstrap package that is encrypted, to decompress a bootstrap image or other bootstrap package that is compressed, to load a bootstrap image or other bootstrap package that includes a distinct file system by installing or otherwise adding that distinct file system, etc.

In addition, as previously noted, a software image that is being executed may include a defined file system, or a software program being executed may otherwise use a defined file system. As will be appreciated, a defined file system provides mechanisms to store computer files in defined locations within the file system, typically in a hierarchical file system structure. For example, the defined file system may include a root directory or other root location, in which is included one or more files and/or one or more other child directories, and with each other directory similarly able to include one or more files and/or one or more other child directories, thus creating a hierarchical tree file system with leaf nodes that do not include other files or directories. In addition, the file systems of some operating systems may support multiple distinct devices or disks or drives that each includes their own file system structure. Thus, when executing a software image that includes a defined file system on a virtual machine computing node, the loading of the software image may include creating that defined file system on the virtual machine computing node, so that the executing software image may access and use that defined file system (e.g., to include operating system files in specified locations, to include data files for use by a software application program in a specified location, etc.).

In a similar manner, in at least some embodiments, a bootstrap image that is used to configure another software image may also include its own distinct file system. In such embodiments, the distinct file system of the bootstrap image is added to the file system being used by the other software image, so that the executing bootstrap image may access and use that distinct file system while it is executing to perform bootstrapping operations, and is optionally removed from the file system being used by the other software image after the execution of the bootstrap image is complete. The distinct file system of the bootstrap image may be added to the defined file system in use by the software image in various manners in various embodiments, such as in a manner supported by the operating system in use. For example, in some embodiments and situations, the distinct file system will be mounted at a leaf node location within a hierarchical tree structure, such that the distinct file system will then be accessible as a sub-tree of the defined file system structure with new files and child directories within that prior leaf node location. In other embodiments and situations, the distinct file system will be assigned a new device, disk or drive name under which the distinct file system will be located. By using a distinct file system in this manner for the bootstrap image, namespacing problems are avoided in which nodes within the distinct file system overlap in name with nodes within the defined file system. In addition, files and other data within the distinct file system may be provided without limitation on size or format that might otherwise be included by a more limited mechanism. Moreover, by containing the bootstrap image files and other data within a distinct file system, additional benefits are achieved related to testing of the bootstrap image, as the distinct file system can be replicated and tested within a defined testbed.

Furthermore, by using bootstrap images in the described manners to perform startup configuration, additional benefits are provided that enable the use of multiple bootstrap images with a single executing software image, as well as supporting multiple versions of a given bootstrap image. For example, because the distinct file system of a bootstrap image is added as a separate portion of the defined file system used by a software image, multiple bootstrap images that each have their own distinct file system may be used in a single software image, with the distinct file systems of each of the bootstrap images being stored at distinct locations with the defined file system of the software image. In a similar manner, multiple distinct versions of a single bootstrap image may be supported within a single software image if so desired, by storing the included file systems of the distinct versions at distinct locations with the defined file system of the software image. In addition, in some embodiments and situations, a single bootstrap package may include multiple different versions or variations of a single bootstrap image, such as to include different included distinct file systems for use with different operating systems, to include different included distinct file systems for use with different versions of the bootstrap image, etc., and with associated bootstrap instructions or other startup instructions selecting a particular one of the different versions or variations for use with a particular software image.

In addition, as previously noted, a chain or sequence of multiple bootstrap images may be used in at least some embodiments and situations, such as with each of the bootstrap images performing different configuration functionality. In some such embodiments, each bootstrap image in the chain may invoke or otherwise initiate the use of a next bootstrap image in the chain, with the chain ending when the last bootstrap image does not initiate the use of any other bootstrap images. In such situations, a bootstrap image may complete execution before the execution of the next bootstrap image begins, or instead multiple bootstrap images may be executed simultaneously. Furthermore, in at least some embodiments and situations, a particular bootstrap image in the chain may execute conditional logic to select a particular next bootstrap image to use or to determine whether to use a next bootstrap image, such as based on a current state of the software image with which it is being used or on other current conditions. As one example provided for illustrative purposes, a first bootstrap image may apply or enforce various security-related measures before a second bootstrap image is executed or otherwise accessed (e.g., to configure an encryption scheme to be used; to establish a VPN, or "virtual private network"; to check for the presence and/or current validity of a security credential or other security mechanism; etc.), or otherwise verify that one or more indicated security criteria or conditions are satisfied before a second bootstrap image is allowed to be accessed, such as to protect confidential information in the second bootstrap image. As another example provided for illustrative purposes, a first bootstrap image may perform one or more types of performance testing on the host computing system on which it is executing before a second bootstrap image is accessed or otherwise executed, such as to access the second bootstrap image only if one or more indicated capabilities are available (or are not available) on the host computing system. Furthermore, in some embodiments and situations, a first bootstrap image may use a symbolic link or other indirect reference to a second bootstrap image, to enable the first bootstrap image to interact with whatever defined file system location is used to store an included distinct file system of the second bootstrap image and/or with whichever second bootstrap image is available.

In at least some embodiments, a software image creator user who provides a software image or a bootstrap image may also interact with the software image execution service to monitor (e.g., in substantially real-time) use of the software image and/or bootstrap image, including to monitor fees to be paid to the software image creator user for the use. Similarly, in at least some embodiments, an end user may interact with the software image execution service to monitor use of one or more software images and/or bootstrap images on behalf of the end user, as well as to monitor any fees owed or paid based on such use. In addition, software image creator users and end users may interact with the software image execution service to update various information about their software images, bootstrap images and subscriptions or other access to software images and/or bootstrap images as appropriate, although in some embodiments and situations a creator user may not be allowed to alter a configured usage model for a software image or bootstrap image in at least some situations (e.g., while one or more end users are executing copies of the software image or using the bootstrap image, while one or more end users have subscriptions to the software image based on the configured usage model, etc.).

As previously noted, in at least some embodiments, a user associated with a software image or bootstrap image (e.g., a software image developer user or other software image creator user that is involved in creation of the software image or bootstrap image) may interact with an embodiment of the software image execution service or bootstrap facility to configure pricing and other information for use of the software image or bootstrap image by other users, such as in one or more configured usage models for the software image or bootstrap image. A configured usage model for an image may include a variety of pricing terms and other information related to use of the image. For example, a software image execution service may define pricing terms for execution of a software image for a user that are based on an indicated amount of use of one or more use dimensions, and the configured usage model for execution of a particular software image via that software image execution service may include one or more configured indicated prices that are each for a configured indicated amount of use of a configured indicated use dimension (e.g., to specify different configured prices for the same amount of use of the same use dimension, such as higher configured prices; to specify configured prices for one or more new custom use dimensions that are not used by the software execution service; to specify configured prices for a different amount of use of the same use dimension; etc.). Furthermore, in at least some embodiments, the configured prices for execution of a software image by a selected software image execution service include a configured price for each use dimension for which the underlying selected software image execution service charges a fee (e.g., for each use dimension, a configured price for that use dimension that matches or exceeds the price charged by the selected software execution service for that use dimension), while in other embodiments the configured prices of the usage model may not include a configured price for each such use dimension (or may include a configured price lower than the corresponding price charged by the underlying selected software image execution service), such that an end user may pay fees for use dimensions having a configured use price in the configured usage model, and such that the software image creator may pay fees for other use dimensions for which the underlying selected software image execution service charges a fee but the configured usage model does not.

In addition, the configured usage model for a particular software image or bootstrap image may further include other types of criteria or other information in at least some embodiments, such as access criteria to control which other users are allowed to execute or use that image (e.g., to indicate that all other users are allowed, to indicate particular users that are allowed and/or excluded, to indicate groups of users that are allowed and/or excluded, to indicate characteristics of users that are allowed and/or excluded, etc.) and/or to indicate conditions under which execution or use of that image is allowed or not allowed (e.g., conditions related to day and/or time, conditions related to a type of use of the image, etc.). As one specific example, a user who configures pricing and other information for a software image or bootstrap image may be part of or otherwise represent an organization or other entity, such as an entity with which multiple users are associated. In such situations, the user may, for example, configure information for the image that allows access to the image to some or all of the multiple associated users but not to some or all other users (or instead may configure pricing information such that the associated users pay less than other users for use of the image, such as by not charging any fee for some or all of the associated users to use the image while other users are charged a fee).

After a software image creator user has configured a usage model for execution or use of a software image or bootstrap image by a selected execution service, the image may be made available to end users in various ways. In some embodiments, the software image creator user (or alternatively the software image execution service) provides the image to the selected execution service for storage, or otherwise stores the image in a storage location accessible to the selected execution service. In this manner, other users may send a request to the selected execution service to initiate execution or use of the image (e.g., along with a unique image identifier corresponding to the stored image), and the selected execution service may access the stored image to initiate such execution or use of a copy of the image.

In addition, in some embodiments, before an end user executes or uses a copy of an image via a selected execution service, the end user first subscribes to the use of the image. In particular, the end user may be directed to interact with the software image execution service to perform the subscription, which may include providing payment information for fees to be charged to the end user, as well as optionally providing other information to the software image execution service (e.g., end user contact information, an indication of assent to any specified use terms and conditions for the image, etc.). The end user may be directed to interact with the software image execution service at various times and in various ways in various embodiments, including when the end user first attempts to initiate execution or use of the image at a selected execution service (e.g., by being directed by the execution service), when the end user is first purchasing access to or otherwise acquiring the image, when the executing image first attempts to perform a particular type of functionality on behalf of the end user, etc. In addition, in some embodiments, the end users may be charged recurring fees (e.g., monthly fees) and/or one-time fees (e.g., setup fees) as part of a subscription. The recurring and/or one-time fees may be charged in advance (e.g., at a beginning of a month for which a monthly fee corresponds) and/or periodically after use has occurred (e.g., at the end of a month for any use in excess of a standard monthly charge during that month). Accordingly, an end user subscription may in some embodiments and situations be for recurring use of an image (e.g., a monthly subscription that is automatically renewed unless otherwise specified), while in other situations may be for other types of use (e.g., for a single use, for use for only a limited specified time, for use for only a limited number of times, etc.).

After an end user subscribes to use an indicated image, in at least some embodiments the end user is provided with information for use with execution or use of the image. For example, in some embodiments, a software image execution service may have access to a stored copy of a software image, and that software image may be associated with one or more configured usage models corresponding to pricing for use of the software image (e.g., by associating one or more software image keys with the software image, with the software image keys being associated with the configured usage models). If so, the end user may merely be provided with an image identifier corresponding to the software image, to be supplied by the end user to the software image execution service along with identifying information about the end user in order to initiate execution of the software image on behalf of the end user. The software image execution service then uses the supplied image identifier to identify the software image to execute for the end user, such as after the software image execution service interacts with the software image execution service to verify that the end user is authorized to execute the software image. An image identifier may have various forms in various embodiments, such as a random alphanumeric string associated with the end user. In a similar manner, a bootstrap image may be associated with one or more configured usage models corresponding to pricing for use of the bootstrap image (e.g., by associating one or more image keys with the bootstrap image, with the image keys being associated with the configured usage models). If so, the end user may merely be provided with an image identifier corresponding to the bootstrap image, to be supplied by the end user to the software image execution service (optionally along with identifying information about the end user) in order to initiate use of the bootstrap image on behalf of the end user.

In some embodiments, a selected software execution service may further be provided with a user token that includes information to use to determine authorization of an end user to execute a software image or otherwise use a bootstrap image, whether directly from the software image execution service after user subscription to the image, or from the end user when he/she supplies that user token to initiate execution or use of the image (e.g., by supplying the user token to a selected software execution service so that it will execute or use the image on behalf of the user, by supplying the user token to the image as it begins to execute, etc.). In other embodiments, a user token may be associated with an image copy in other manners, such as if other software stores the user token and supplies it when appropriate for use with that image copy. The user token may have various forms in various embodiments, such as a random alphanumeric string associated with the end user, or an alphanumeric string that includes various information about the end user (e.g., an indication of the end user name and/or unique identifier, an indication of an image key for the image with which the user token may be used, an indication of a creation time and a subsequent time-to-live value during which the end user may use the user token, etc.) and that may be encoded to protect the included information (e.g., by being encrypted, by being the result of a one-way hash, etc.).

A user token (or other user information based on the user token, such as a user credential, discussed below) may be used in various ways in various embodiments, such as by a selected execution service to verify that the end user is authorized to execute or use an indicated image (e.g., based on information stored as part of the user token, based on an interaction with the execution service to verify the user token for the indicated image, etc.), or by including the user token/information as part of a call by the executing image copy to invoke or request access to a selected external invocable service.

When an execution service obtains a user token or other information about a user (e.g., based on an initial interaction initiated by the execution service when initiating execution or use of an image, based on a subsequent interaction initiated by the execution service to report execution or use of an image that has been completed or is ongoing, etc.), the user information may be used by the execution service to identify the end user on whose behalf the service use occurred (and if the user tokens are specific to the images with which they are used, to identify the image), and to track the use by that end user. When appropriate (e.g., once a month, for each service usage, etc.), the payment information specified by the end user may be retrieved and used for providing payment for that use of the execution service, such as based on the configured usage model for the image.

In some embodiments, when a selected execution service receives a user token or other information about an end user, it provides a user credential based on the user token (e.g., a public key certificate or identity certificate, such as an X.509 certificate based on the Internet Engineering Task Force's Public-Key Infrastructure X.509 standard), such as based on the user token and other information related to an identity of the end user and/or a computing device of the end user on which the software image copy will be executed. After such a user credential is provided by the execution service, it may be stored by the executing image copy, and used to make service invocation calls or other requests to obtain access to selected external functionality. As previously noted, in some embodiments such user credentials may have a limited time-to-live, such that the end user, selected execution service and/or executing image copy may need to periodically obtain new user certificates from the software image execution service. Furthermore, in some embodiments a user credential may include additional information, such as information about use restrictions (e.g., that service invocations based on the user credential may occur only at certain times, only at certain volumes, etc.), which may then be enforced by the execution service and/or executing image copy. In addition, in some embodiments the user credential is used to associate an executing software image copy, executing bootstrap image copy, end user and end user's computing device together, such that access to some or all of the functionality of the executing software image copies may be available only to the end user and only on the end user's computing device.

In addition, in some embodiments, a software image execution service may charge various fees for the functionality that it provides. For example, the software image execution service may charge a fee to a software image creator for providing capabilities to allow the software image creator to specify one or more configured usage models for a provided image, for providing capabilities to meter usage of particular images and obtain corresponding payment from end users, etc. Furthermore, the fees charged may have various forms, such as a predetermined percentage (e.g., 10%) of the proceeds after paying service provider(s) for use of their service(s), a predetermined amount for each service (e.g., $0.50), etc., or a combination thereof. Additional details related to configuring prices and allocating fees between software image creators or other software image providers, service providers, and a configuration facility are included in U.S. patent application Ser. No. 11/963,331, filed Dec. 21, 2007 and entitled "Providing Configurable Pricing For Execution Of Software Images;" in U.S. patent application Ser. No. 11/618,469, filed Dec. 29, 2006 and entitled "Providing Configurable Pricing For Use Of Invocable Services By Applications;" in U.S. patent application Ser. No. 11/618,480, filed Dec. 29, 2006 and entitled "Using Configured Application Pricing To Determine End User Fees For Use Of Invocable Services;" and in U.S. patent application Ser. No. 11/618,486, filed Dec. 29, 2006 and entitled "Providing Configurable Use By Applications Of Sequences Of Invocable Services;" each of which is hereby incorporated by reference in its entirety.

As previously noted, the described techniques may be used in various manners in various embodiments. For example, a software image execution service may be used with various types of software images, such as a software image that provides server-based capabilities that may be programmatically accessed by one or more remote client applications, a software image that an end user may interactively use via a graphical user interface of a client application (e.g., desktop applications or Web applications) executing on a client computing device of the end user, a command-line interface (e.g., for a system utility), etc. Similarly, executing images may access and use various types of remote invocable services, including, but not limited to, Web services, storage services, indexing services, and queuing services. In addition, some or all of the invocable services may be provided by an entity providing the software image execution service and/or by third-party service providers.

Furthermore, in at least some of the embodiments discussed above, users may also enhance existing software images (e.g., software images created by other users) in at least some situations by creating new enhanced software images based on the existing software images, such as by adding additional software and/or by integrating third-party fee-based functionality into the new software image that was not present for the underlying existing software image, including to integrate one or more bootstrap images as part of the new software image for use in configuring the underlying existing software image. If so, such enhanced image creator users may similarly configure one or more usage models for execution of such an enhanced software image by a selected execution service, such as based on the configured usage model(s) of the underlying existing software image on which the enhanced software image is based (e.g., by configuring one or more prices for the enhanced software image that exceed corresponding configured prices for the underlying existing software image). In such embodiments, when an end user executes such an enhanced software image, the end user is charged one or more fees that are determined based on the configured usage model(s) for the enhanced software image. Furthermore, the creator user for the underlying existing software image on which the enhanced software image is based may in at least some embodiments receive at least some of the fees charged to the end user of the enhanced software image, such as some or all of the fees corresponding to the configured usage model(s) for the underlying existing software image. Such relationships between the enhanced software image and the underlying existing software image may be determined in various ways, such as by associating distinct software image keys with the enhanced software image that correspond to the enhanced software image and the underlying existing software image, by associating the software image key for the underlying existing software image with the software image key for the enhanced software image so that the relationship is maintained, etc. In this manner, a hierarchy or sequence of two or more software images may be constructed such that each software image in the hierarchy/sequence other than the first is an enhanced software image that adds to the underlying existing software image on which the enhanced software image is based.

In other embodiments and situations, such enhanced software images based on existing software images may not be allowed, such as if the creator or other provider of an existing software image prohibits or restricts the ability of others to create enhanced software images based on the existing software images (e.g., via technological restrictions encoded in the existing software image, such as based on not allowing others to have root-level access privileges; via restrictions specified as part of a configured usage model for the existing software image and/or based on restrictions specified to a software image execution service, such as to be enforced by the software image execution service; etc.). Similarly, in some embodiments, once pricing and/or other information from a configured usage model is associated with an image (e.g., based on associating a software image key with the image), the ability to modify or remove that associated information may be restricted or prohibited, such as to disallow users other than the image creator to modify and/or remove that pricing information, or to instead disallow all users from modifying and/or removing that pricing information.

In addition, in at least some embodiments, pricing information and image identifiers may be associated with and used with software images in various other manners. For example, in some embodiments, a user may be allowed to subscribe to a group of multiple images (e.g., multiple images from a single creator user; multiple images configured to execute in conjunction with each other, such as a software image and one or more associated bootstrap images; etc.), such that the user receives a single image identifier that corresponds to that group of images. When the user later supplies the image identifier to a software image execution service, the user may be allowed to execute some or all of the multiple images of that group based on that image identifier. Similarly, in some embodiments and situations, one or more images may have multiple associated configured usage models (e.g., based on multiple software image keys being associated with the one or more images) that each correspond to distinct pricing for use of the one or more images, such that an end user who subscribes to such an image may pay fees for using the image that are based on a combination of the multiple configured usage models. Such multiple configured usage models may be supplied by a single user or by multiple users, and may be inter-related or independent of each other in various embodiments.

Figure 2:
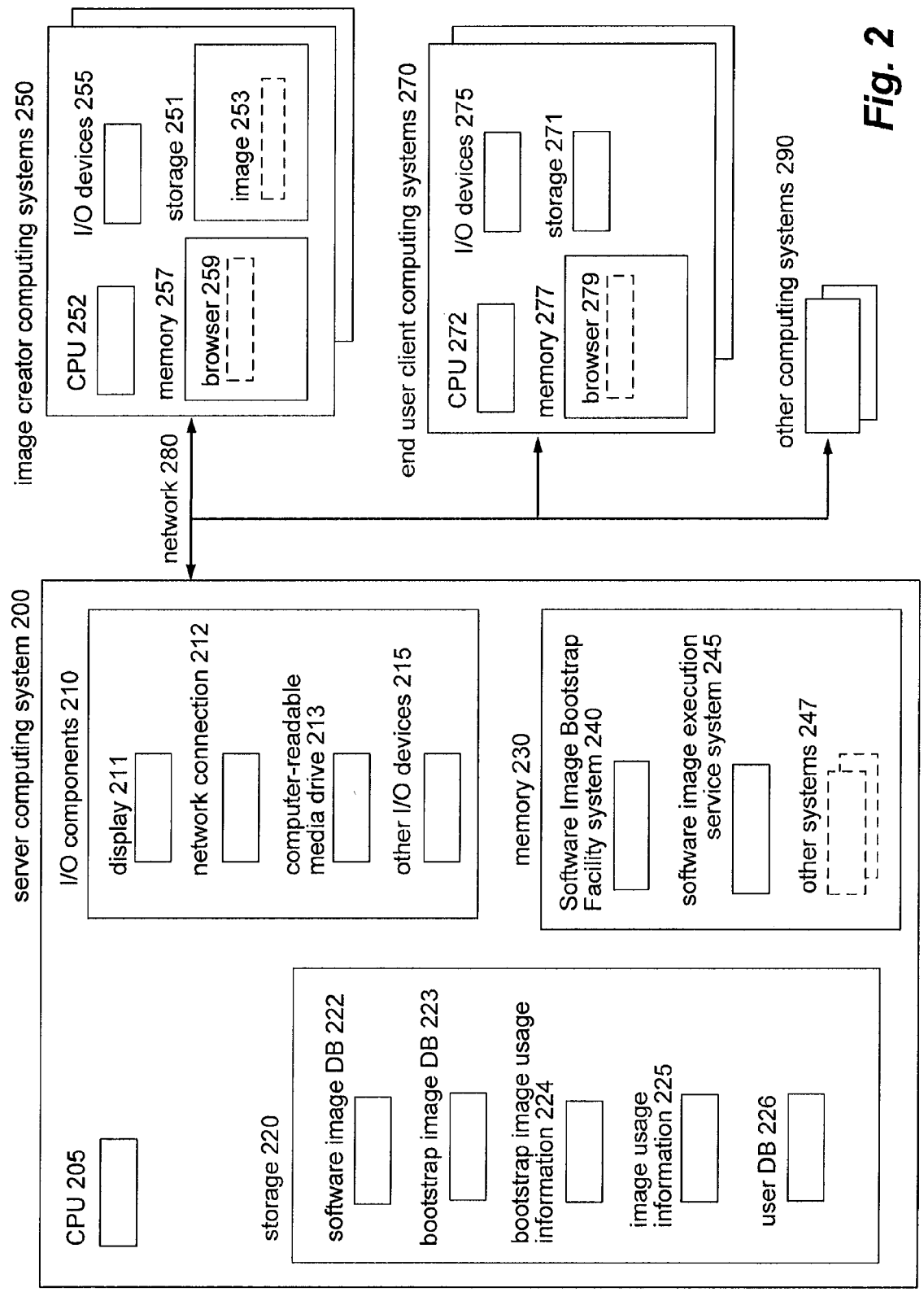
FIG. 2 is a block diagram illustrating an example embodiment of a computing system suitable for facilitating bootstrapping of executable software images.

FIG. 2 illustrates a server computing system 200 suitable for executing an embodiment of a software image bootstrap facility system and/or an embodiment of a software image execution service system, as well as various other computing systems. In this example, the other computing systems include one or more image creator client computing systems 250, one or more end user client computing systems 270, and one or more optional other computing systems 290. In the illustrated embodiment, the server computing system 200 includes one or more CPU ("central processing unit") processors 205, various I/O ("input/output") components 210, storage 220, and memory 230. The example I/O components include a display 211, a network connection 212, a computer-readable media drive 213, and other I/O devices 215 (e.g., a keyboard, a mouse, speakers, etc.).

The software image bootstrap facility system 240 is executing in memory 230 to provide an embodiment of the software image bootstrap facility, and it interacts with the other computing systems over the network 280 (e.g., via the Internet and/or the World Wide Web, via a private cellular network, etc.). The other computing systems may similarly execute various software as part of the interactions. For example, a Web browser 259 executing in memory 257 of an image creator computing system 250 allows an image creator user (not shown) to interact with the software image bootstrap facility system 240 over the network 280 (e.g., to configure usage models for bootstrap images being registered for use to configure startup of other software images). After one or more such bootstrap images are registered, the system 240 stores information about the registered bootstrap images in a database data structure 223 on storage 220, and optionally provides information about the registered bootstrap images to the software image execution service system 245 and/or to other systems (e.g., to optional other systems 247). In addition, the software code and any other data that is part of a registered bootstrap images may also or alternatively be stored remotely (e.g., on an optional other computing system 290, such as that provides an online storage service; as an image 253 on storage 251 of the image creator user's computing system 250; etc.) and retrieved by the systems 240 and/or 245 as desired.

In addition, the software image execution service system 245 is also executing in memory 230 to provide an embodiment of the software image execution service, although in other embodiments the systems 240 and 245 may be provided on distinct server computing systems (e.g., optionally operated by distinct entities) or may be part of a single software system. In this example, the software image execution service system 245 also interacts with other computing systems over the network 280. For example, a Web browser 259 executing in memory 257 of an image creator computing system 250 allows an image creator user (not shown) to interact with the software image execution service system 245 over the network 280 (e.g., to specify information for software images to be executed, including to indicate registered bootstrap images that will be used to configure startup of such a software image). As part of enabling an image creator user to obtain information about registered bootstrap image, the software image execution service system 245 may dynamically interact with the software image bootstrap facility system 240 in order to obtain current information about registered bootstrap images, or may in some embodiments obtain such information in other manners (e.g., based on accessing the database 223 on storage or a remote storage service on a computing system 290, based on retrieving stored information that was previously pushed to the system 245 by the system 240, etc.). The system 245 stores information about the available software images in a database data structure 222 on storage 220, such as an executable copy of the software image. Thus, the software code and any other data that is part of a software image may in some embodiments be stored in the database 222 on storage 220 and/or remotely (e.g., as an image 253 on storage 251 of the image creator user's computing system 250, on an optional other computing system 290, etc.) and retrieved by the system 245 as desired.

After information for a software image has been specified to the software image execution service system by an image creator user, that image creator user or another end user on a computing system 270 may interact with the software image execution service system 245 (e.g., via a browser 279 executing in memory 277 or via a browser 259) to initiate execution of the software image, including to specify one or more bootstrap images to be used to configure the startup of the software image. In the illustrated embodiment, the software image execution service system may use one or more of a plurality of available computing nodes (e.g., on one or more of the optional other computing systems 290) to execute the software image, although in other embodiments the software image execution may be performed in other manners (e.g., on the server computing system 200, on a computing system 250 or 270 of the user that initiates the execution, etc.). The software image execution service system manages the execution of the software image throughout the execution lifecycle, and further tracks information about the use of any specified bootstrap images, as well as optionally about the execution of the software image independently of any such bootstrap images. In the illustrated embodiment, a variety of additional database data structures 224 and 225 are present on the storage 220 for use by the software image execution service system, such as to store information about such tracked usage of bootstrap images and software images, respectively, although in other embodiments some or all such databases may instead be located elsewhere and/or be organized in other manners. Furthermore, in other embodiments the stored information may be stored in other manners.

The software image execution service system 245 further performs automated operations in some embodiments and situations to determine fees owed by an end user for the execution of the software image, such as based at least in part on the tracked usage of the bootstrap images and on pricing-based conditions in the configured usage models for those bootstrap images. The software image execution service system 245 may further in some embodiments perform automated operations to obtain corresponding payment for the determined fees in at least some embodiments (e.g., based on dynamically obtained or previously obtained payment information for the user, such as part of user account information for the user that may be stored by the system 245 in a user database 226 of the storage 220), although in other embodiments the system 245 may instead provide information about the determined fees to one or more other systems to obtain payment. Such other systems may include, for example, an automated payment system that is one of the other systems 247.

It will be appreciated that the illustrated computing systems are merely illustrative and are not intended to limit the scope of the present invention. The computing systems 200, 250, 270 and/or 290 may instead each include multiple interacting computing systems or devices, and those computing systems may be connected to other devices that are not illustrated, including through one or more networks such as the Internet, via the Web, or via private networks (e.g., mobile communication networks, etc.). More generally, a server or client computing system or device may comprise any combination of hardware that can perform the indicated functionality, optionally when programmed or otherwise configured with corresponding software, including (without limitation) desktop or other computers, network devices, PDAs ("Personal Digital Assistants"), cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems 240 and/or 245 may in some embodiments be distributed in various modules (not shown). In some embodiments, at least some of the described functionality of the software image bootstrap facility system may instead not be provided and/or other additional functionality may be available, and similarly at least some of the described functionality of the software image execution service system may instead not be provided and/or other additional functionality may be available.

It will also be appreciated that, while various items are discussed or illustrated as being stored in memory or on storage while being used, these items or portions of them may be transferred between memory and other storage devices for purposes of memory management and data integrity. Alternatively, in other embodiments some or all of the software systems may execute in memory on another device and communicate with the illustrated computing systems via inter-computer communication. Furthermore, in some embodiments, some or all of the systems and/or modules may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on a non-transitory computer-readable storage medium, such as a hard disk, memory, a network, or a portable media article (e.g., a DVD or a flash memory device) to be read by an appropriate drive or via an appropriate connection. Such stored systems, modules and/or data structures may in some embodiments and situations include software instructions that program or otherwise configure one or more computing systems to perform some or all of the described techniques when executed by one or more CPUs or other processors. The systems and data structures may also in one or more embodiments be transmitted via generated stored data signals (e.g., by being encoded in a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 6:
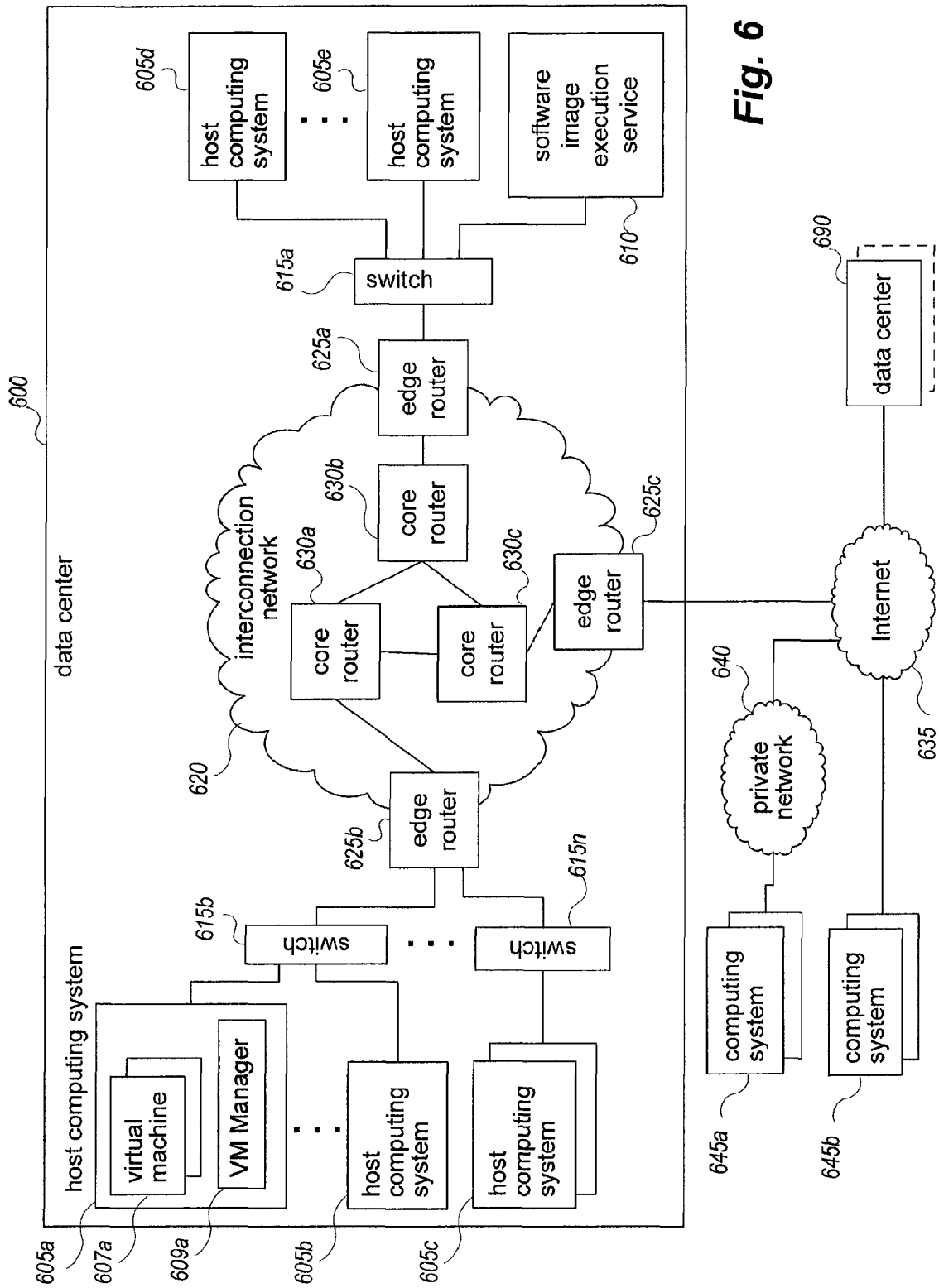
FIG. 6 is a network diagram illustrating an example embodiment of computing systems suitable for facilitating bootstrapping of executable software images.

FIG. 6 illustrates an embodiment in which a software image execution service, optionally including a software image bootstrap facility (not shown), may be provided using one or more data centers that include multiple physical computing systems (e.g., other computing systems 290 of FIG. 2). In particular, FIG. 6 is a network diagram illustrating an example embodiment in which a software image execution service manages execution of software images on behalf of users, and may further in some embodiments perform operations of an embodiment of a software image bootstrap facility that is integrated with the software image execution service in this example. The illustrated example includes a data center 600 in use by the software image execution service that is connected to the Internet 635 external to the data center 600. In this example, the Internet 635 provides access to various external computing systems, such as computing systems 645*a* via private network 640 and computing systems 645*b*. The private network 640 may be, for example, a corporate network that is wholly or partially inaccessible from non-privileged computing systems external to the private network 640. Computing systems 645*b* may include, for example, a home computing system that connects directly to the Internet (e.g., via a telephone or cable modem, a Digital Subscriber Line ("DSL"), etc.). In addition, one or more other data centers 690 are illustrated that are connected to data center 600 via the Internet 635, such as may further be used by the software image execution service in at least some embodiments.

The data center 600 includes a number of physical host computing systems 605*a*-605*e* and a system 610 that provides the software image execution service. In this example, host computing system 605*a* provides multiple virtual machines 607*a* and a virtual machine ("VM") Manager component 609*a* to manage those virtual machines (e.g., a hypervisor or other virtual machine monitor), and some or all of the other host computing systems 605*b*-605*e* may similarly have one or more such virtual machines and/or VM Manager components (not shown). Alternatively, in other embodiments, some or all of the physical host computing systems at the data center may not provide any virtual machines, such as to instead directly execute one or more software images or other software programs on behalf of end user customers of the software image execution service. Furthermore, in some embodiments various of the host computing systems may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their software images may be grouped (e.g., automatically) according to one or more such factors, which may further be used as constraints and/or preferences regarding which host computing systems to select for particular software image copies.

The data center further includes multiple networking devices, such as switches 615*a* and 615*b*-615*n*, edge routers 625*a*-625*c*, and core routers 630*a*-630*c*. Switch 615*b* is part of a physical network that includes two or more physical host computing systems 605*a*-605*b*, and is connected to edge aggregation router 625*b*. Edge aggregation router 625*b* connects the switched network for switch 615*b* to an interconnection network 620 of the data center, and further in the illustrated embodiment connects one or more other switches 615*n* (and their switched networks of host computing systems 605*c*) to each other, to switch 615*b*, and to the interconnection network. Switch 615*a* is part of a distinct physical network that includes physical computing systems 605*d*-605*e* and one or more programmed computing systems (not shown) providing the system 610, and is connected to edge router 625*a*. Numerous other computing systems and networking devices, including other switches connected to edge router 625*a*, may be present, but are not illustrated here for the sake of brevity. The physical networks established by switch 615*a* and by switches 615*b*-615*n* are connected to each other and other networks (e.g., the Internet 635) via the interconnection network 620, which includes the edge routers 625*a*-625*c* and the core routers 630*a*-630*c*. The edge routers 625*a*-625*c* provide gateways between two or more networks. For example, edge router 625*a* provides a gateway between the physical network established by switch 615*a* and the interconnection network 620. Edge router 625*c* provides a gateway between the interconnection network 620 and Internet 635, as well as to the dedicated high-speed data connection 680. The core routers 630*a*-630*c* manage communications within the interconnection network 620, such as by forwarding packets or other data transmissions as appropriate based on characteristics of such data transmissions (e.g., header information including source and/or destination addresses, protocol identifiers, etc.) and/or the characteristics of the interconnection network 620 itself (e.g., routes based on network topology, etc.).

The illustrated system 610 performs at least some of the described techniques in order to manage execution of software images and other software programs on the physical host computing systems 605*a*-605*e*, including to use bootstrap images to automatically perform startup configuration operations, as described in greater detail elsewhere. When a particular host computing system is selected to execute one or more software image copies, the system 610 may in some embodiments initiate execution of those software image copies by interacting with a VM Manager component (or other manager component if the selected host computing system does not provide virtual machines) that controls execution of programs for that selected host computing system for the software image execution service, or may alternatively directly execute the software image copy on the selected host computing system. In addition, as discussed in greater detail elsewhere, the system 610 may interact with an embodiment of a software image storage service to obtain stored copies of software images in some embodiments.

It will be appreciated that the data center of FIG. 6 is provided for illustrative purposes only, and that functionality of software image execution services and/or a software image bootstrap facility may be provided in other manners in other embodiments.

Figure 3:
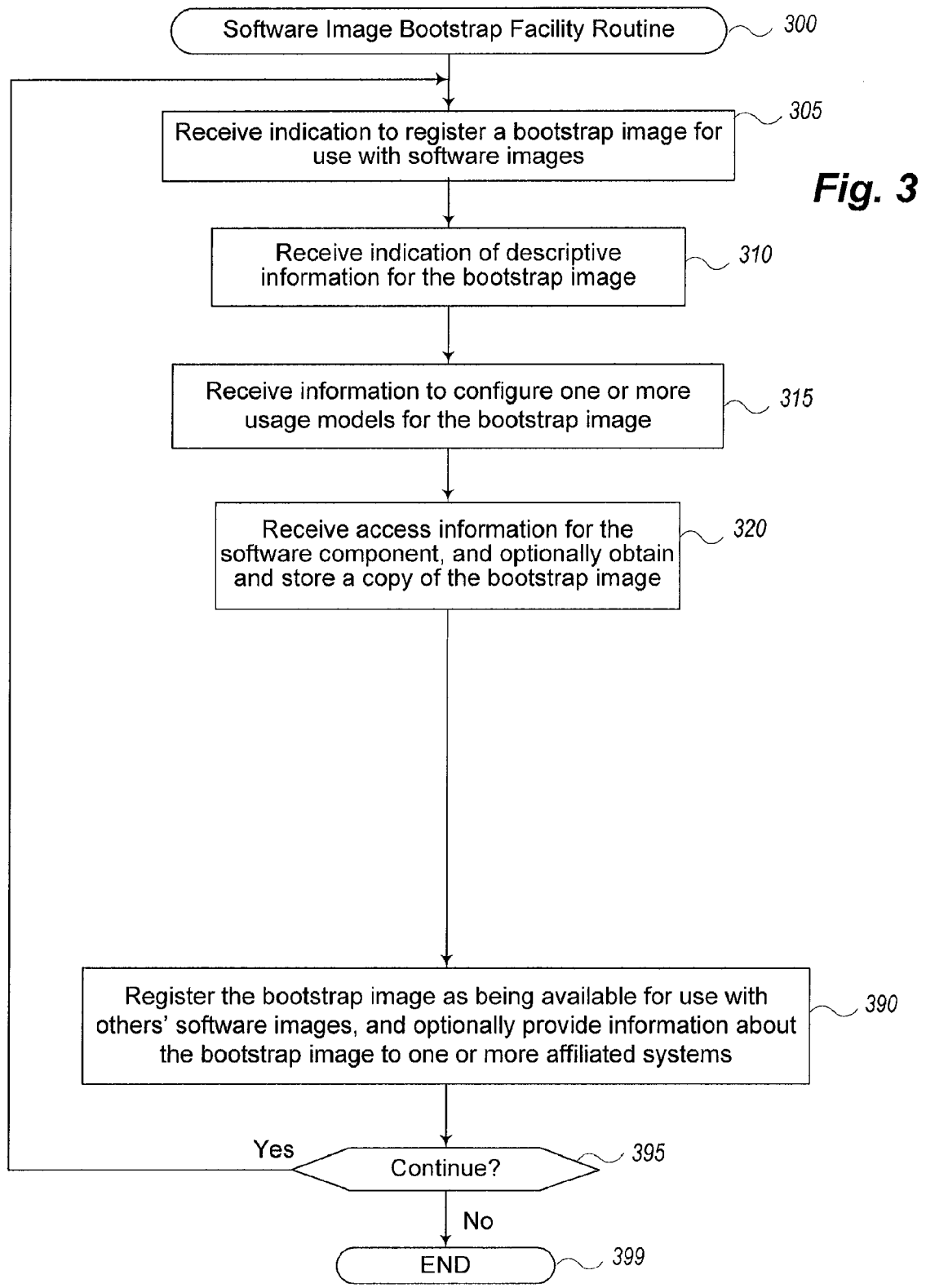
FIG. 3 is a flow diagram of an example embodiment of a Software Image Bootstrap Facility routine.

FIG. 3 is a flow diagram of an example embodiment of a Software Image Bootstrap Facility routine 300. The routine may, for example, be provided by execution of the software image bootstrap facility system 110 of FIGS. 1A-1C, of the software image bootstrap facility system 240 of FIG. 2 and/or of the system 610 of FIG. 6, such as to allow bootstrap image creator users to register their bootstrap images and to configure usage models for use of those bootstrap images. In this illustrated example, the bootstrap image registration is performed in an interactive manner by the image creator user, although in other embodiments it may be performed in other manners.

The illustrated embodiment of the routine begins at block 305, where the routine receives an indication from an image creator user to register a bootstrap image. In block 310, information is received from the image creator user that indicates descriptive information for the bootstrap image, such as a name and description of its functionality. In block 315, the routine then receives information from the image creator user to configure one or more usage models for the bootstrap image. As discussed in greater detail elsewhere, each such configured usage model may optionally have one or more pricing conditions and may optionally have one or more non-pricing conditions. In block 320, the routine then receives access information from the image creator user for use in accessing the bootstrap image as needed, such as by receiving an uploaded copy of the bootstrap image or by receiving information to enable later retrieval of the bootstrap image (e.g., from an indicated network-accessible location).

After block 320, the routine continues to block 390 to complete the registration of the software component so that it is available for use in configuring other software images (e.g., software images from third-party image creator users), including to store the information received in blocks 310-320, and further optionally provides information about the registered bootstrap images to one or more affiliated systems. As described in greater detail elsewhere, such affiliated systems may include, for example, one or more software image execution systems providing execution services.

After block 390, the routine continues to block 395 to determine whether to continue, such as until an explicit indication to terminate is received. If so, the routine returns to block 305, and if not continues to block 399 and ends.

Figure 4A:
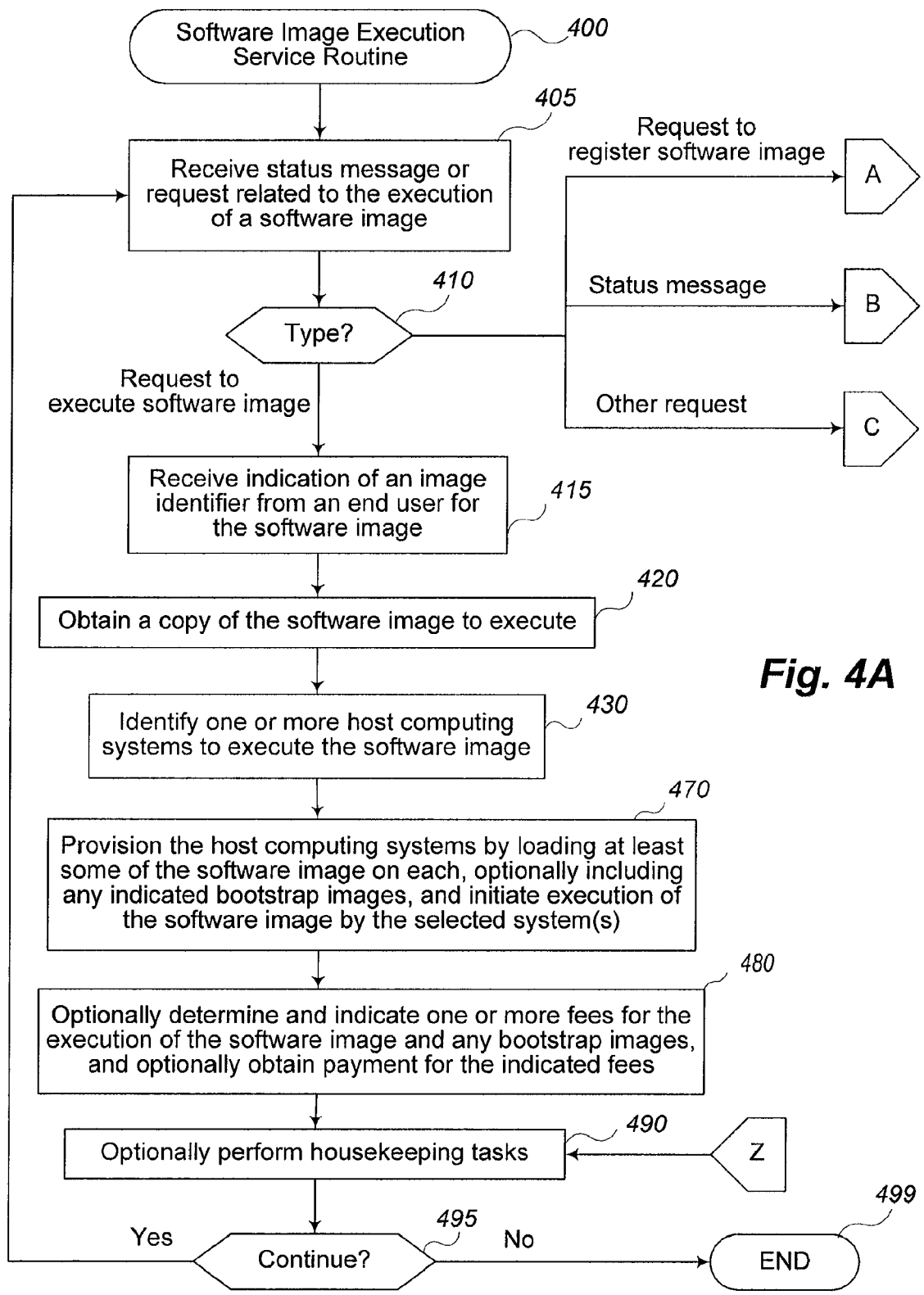
FIGS. 4A and 4B are a flow diagram of an example embodiment of a Software Image Execution Service routine.
Figure 4B:
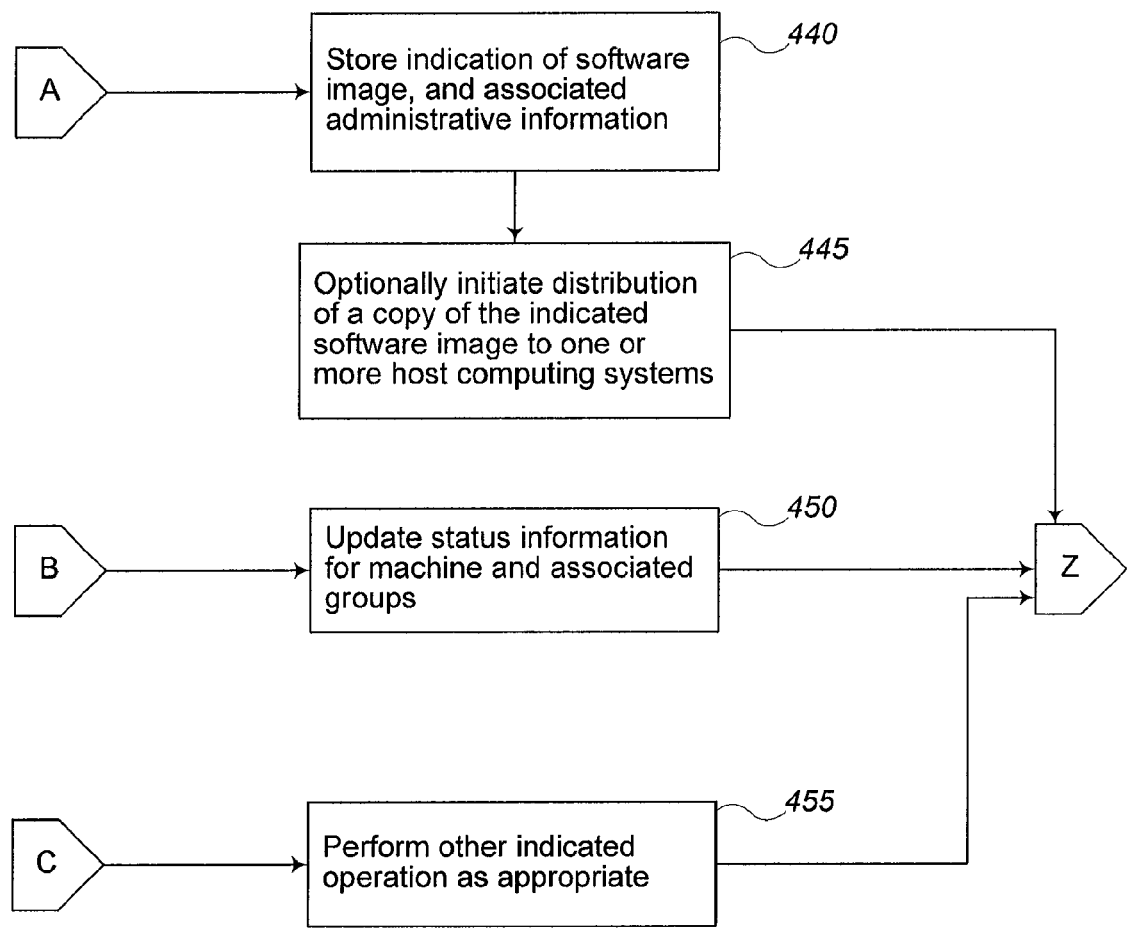

FIGS. 4A and 4B illustrate a flow diagram of an example embodiment of a Software Image Execution Service routine 400. The routine may be provided by, for example, execution of the software image execution service 105 of FIGS. 1A-1C, system 610 of FIG. 6, and/or system 245 of FIG. 2 in order to manage execution of software images and/or other software programs for users, including to use bootstrap images to provide automated startup configuration services for software images.

The illustrated embodiment of the routine 400 begins at block 405, where a request related to the execution of a software image or a status message related to software image execution is received. In this embodiment, the request may be received from various sources internal or external to the software image execution service (e.g., a remote customer user requesting execution of one or more copies of an indicated software image). In block 410, the routine determines the type of request received.

If it is determined in block 410 that the request is to execute one or more copies of a software image, the routine continues with block 415. In block 415, the routine receives an indication from an end user of identifying information for the user (e.g., a unique user identifier, login information, etc.) and an image identifier that corresponds to the one or more software images to be executed, although in other embodiments other types of information may be received (e.g., a user token that reflects a subscription to the indicated software image or other access authorization for the indicated software image). The image identifier may correspond to the one or more software images to be executed by identifying one or more software images that are already stored by or otherwise registered with the software image execution service, while in other embodiments the end user may instead supply a copy of the indicated software image(s) to be executed. In addition, unless one or more bootstrap images have already been associated with the indicated software image (e.g., by the end user for later use; by the creator or other provider of the software image, such as by including corresponding bootstrap instructions within the software image when it is created or by specifying bootstrap instructions to be used with an already created software image; etc.), the routine may further receive information in block 415 to indicate one or more such bootstrap images to be used, such as by receiving associated bootstrap instructions for the indicated software image that reference those one or more bootstrap images (e.g., via image identifiers for those bootstrap images).

In block 420, the routine then obtains a copy of the indicated software image(s) and bootstrap image(s), such as by retrieving a stored or otherwise accessible copy for each. The routine then continues to block 430 to identify one or more host computing systems that are available to and appropriate for executing at least one software image copy.

In block 470, the routine then provisions each of the identified host computing systems and initiates execution of the software image(s) on the host computing system, with the provisioning including initiating loading of at least some of the software image(s) and/or bootstrap image(s) on each host computing system. In other embodiments and situations, one or more of the bootstrap images may instead be loaded onto a host computing system at a later time after execution of a software image begins, such as during execution of bootstrap instructions for the software image. The routine then continues to block 480 to optionally determine and indicate one or more fees for the execution of the software image and any bootstrap images, including to optionally obtain payment for the indicated fees, but in other embodiments may determine at least some of the fees at other times (e.g., after use of the software images and/or bootstrap images is tracked during their execution, such as may be performed with respect to block 455).

If it is instead determined in block 410 that the request received in block 405 is to register a software image of a user for later use (e.g., to provide a copy of the software image to the software image execution service for storage, to provide information about a configured usage model for a software image, to provide information about bootstrap instructions or otherwise about one or more bootstrap images to be later used with the software image, etc.), the routine continues to block 440. In block 440, the routine stores provided information about the software image, and in block 445 optionally proceeds to provide one or more copies of the software image to one or more distributed storage locations near to or otherwise associated with particular subsets of the host computing systems (e.g., to local software image caches at each of one or more data centers). In other embodiments, an end user may store bootstrap instructions in a manner that is not associated with any particular software image, and later indicate those stored bootstrap instructions to be used with one or more specified software images, such as at a time of execution of those software images.

Alternatively, if it is determined in block 410 that a message is received in block 405 with status information related to execution of software images by host computing systems (e.g., periodic reports on amounts of resource usage on various host computing systems, an indication of use of a particular bootstrap image for a particular user, a report of a failure of a computing system or other hardware device, a report of a failure of an executing software image copy based on its early termination, etc.), the routine continues instead to block 450 to store that status information for later use (e.g., for use in selecting particular host computing systems, for use in determining fees, etc.). Otherwise, if it is instead determined in block 410 that some other type of request or message is received in block 405, the routine continues to block 455 to handle the request or message as appropriate. As previously noted, in some situations the operations performed with respect to block 455 may include perform periodic determination of fees owed and/or obtaining of owed fees, such as based on usage information received and stored with respect to block 450, and in a manner similar to that previously discussed with respect to block 480.

After blocks 480, 445, 450, or 455, the routine continues to block 490 to optionally perform any periodic housekeeping operations (e.g., to determine whether to move some executing software image copies from current host computing systems to other host computing systems, such as to balance utilization of resources or for other reasons). After block 490, the routine continues to block 495 to determine whether to continue, such as until an explicit indication to terminate is received, and if so returns to block 405. If not, the routine continues to block 499 and ends.

FIG. 5 illustrates a flow diagram of an example embodiment of a routine 500 that may be executed on each of host computing systems. The routine may be provided by, for example, execution of the virtual machine manager components 609a of FIG. 6 for host computing systems that host virtual machines, and/or directly by a similar component on a host computing system that does not host virtual machines.

The illustrated embodiment of the routine 500 begins at block 505, where instructions or other information is received. The routine continues to block 510 to determine whether instructions to provision the host computing system to execute one or more software images are received in block 505, such as may be initiated by block 470 of routine 400 of FIGS. 4A-4B. If so, the routine continues to block 515 to load the one or more indicated software images on the host computing system and to prepare them for use. For example, if a software image includes a defined file system and is to be executed on a computing node that is one of multiple virtual machines hosted by the host computing system, the loading of the software image may include installing the defined file system on the one virtual machine. In addition, if one or more bootstrap images are indicated, the routine in block 515 may similarly load one or more such bootstrap images for subsequent use, although in other embodiments may not load such bootstrap images until corresponding startup configuration activities are to be performed.

After block 515, or if it was instead determined in block 510 that the information received in block 505 were not instructions to provision the host computing system, the routine continues to block 530 to determine whether instructions are received in block 505 to initiate execution of an indicated software image, such as may be initiated by block 470 of routine 400 of FIGS. 4A-4B, and if so continues to block 535. While the provisioning and execution initiation steps occur at substantially the same time in the example embodiment of routine 400 of FIG. 4, in other embodiments a host computing system may be provisioned farther in advance of later execution. In block 535, the routine begins execution of the indicated software image(s), and then continues to block 540.

In block 540, the routine determines whether any bootstrap instructions have been supplied for or otherwise associated with the software image, such as may be concurrently received with the information in block 505 (e.g., specified by the user on whose behalf the software image is to be executed), may have been previously stored in or otherwise associated with the software image, or may have been otherwise previously specified for use with the software image (e.g., during earlier provisioning activities). If so, the routine continues to block 545 to perform corresponding bootstrap operations, and otherwise proceeds to block 595 and continues execution of the software image. In block 545, the routine loads and executes a first specified bootstrap image, including mounting any included file system of the bootstrap image as part of the defined file system being used by the software image. As discussed in greater detail elsewhere, the loading and execution of the first bootstrap image may be performed as part of executing the bootstrap instructions, such as may occur automatically by the operating system that is specified in the software image or otherwise used to execute the software image. In addition, the execution of the bootstrap image may include performing a variety of types of configuration activities.

After block 545, the routine continues to block 555 to determine whether the bootstrap instructions and/or current bootstrap image references one or more other bootstrap images, such as one or more next bootstrap images in a chain. If so, the routine continues to block 560 to load and execute the specified one or more next bootstrap images, including mounting any included file system(s) of the bootstrap image(s) as part of the defined file system being used by the software image, in a manner similar to that of block 545. The routine then returns to block 555 to determine whether any other bootstrap images remain to be loaded and executed, and if so continues again to block 560. If it is instead determined in block 555 that no additional bootstrap images are referenced, the routine continues instead to provide indications of the one or more bootstrap images used, and optionally unmounts or otherwise removes the one or more included file systems of those bootstrap images. The information in block 570 may be provided, for example, to routine 400, such as is discussed in greater detail with respect to blocks 450 and 480.

If it is instead determined in block 530 that instructions are not received in block 505 to initiate execution of an indicated software image, the routine continues instead to block 590 to perform one or more indicated operations as appropriate. Such operations may include, for example, modifying ongoing execution of a specified software image, providing requested usage information corresponding to one or more software images and/or bootstrap images, providing other types of requested status information, etc.

After blocks 570 or 590, or if it is instead determined in block 540 that no bootstrap instructions are specified, the routine continues to block 595 to determine whether to continue, such as unless an explicit indication to terminate is received. If so, the routine returns to block 505, and otherwise continues to block 599 and ends.

In addition, various embodiments may provide mechanisms for customer users and other users to interact with an embodiment of the software image execution service (or other group of multiple computing systems available to execute user software images) in various ways for purposes of executing software image copies. For example, as previously noted, some embodiments may provide an interactive console (e.g. a client application program providing an interactive user interface, a Web browser-based interface, etc.) from which users can manage general administrative functions related to the operation and management of hosted software virtual machine images or other software images (e.g., the creation or modification of user accounts; the provision of new software images; the initiation, termination, or monitoring of hosted software images; the reservation of time or other system resources; etc.), including to specify the use of particular bootstrap images. Additional details related to the operation of example embodiments of software image execution services and other software execution services with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" and U.S. application Ser. No. 11/692,038, filed Mar. 27, 2007 and entitled "Configuring Intercommunications Between Computing Nodes;" and U.S. application Ser. No. 11/851,345, filed Sep. 6, 2007 and entitled "Executing Programs Based On User-Specified Constraints;" each of which is incorporated herein by reference in its entirety.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by a computing system that is part of a software execution service, instructions to execute an indicated software program that has an associated bootstrap package for use in performing bootstrap operations for the software program;
initiating, by the computing system, executing of the software program on a host computing system and loading of the bootstrap package on the host computing system to cause performance of the bootstrapping operations for the executing software program, wherein the executing software program uses a defined file system on the host computing system, and wherein the performance of the bootstrapping operations includes incorporating a distinct file system used by the bootstrap package into a portion of the defined file system on the host computing system that is not otherwise used by the executing software program; and
after completion of the performance of the bootstrapping operations, continuing executing the software program on the host computing system using the defined file system.

2. The computer-implemented method of claim 1 wherein the software program is a software image that includes the defined file system and operating system software and software for at least one application program, and wherein the executing of the software program on the host computing system includes installing the defined file system on the host computing system and executing on the host computing system the operating system software and the software for the at least one application program.

3. The computer-implemented method of claim 1 wherein the bootstrap package is a bootstrap software image that is separate from the software program and that includes a distinct file system that is not part of the defined file system, and wherein the loading of the bootstrap package includes adding the included distinct file system as a new portion of the defined file system on the host computing system, the added new portion being the portion of the defined file system that is not otherwise used by the executing software program.

4. The computer-implemented method of claim 1 wherein the software execution service provides a plurality of host computing systems for use in executing software programs for a plurality of users of the software execution service, wherein the received instructions are from one of the plurality of users and specify the indicated software program, and wherein the initiating of the executing of the software program on the host computing system is performed on behalf of the one user and includes selecting the host computing system from the plurality of host computing systems.

5. The computer-implemented method of claim 1 wherein the bootstrapping operations are performed as part of booting the executing software program on the host computing system and include configuring the executing software program in a specified manner, and wherein continuing the executing of the indicated software program includes using the configured software program.

6. The computer-implemented method of claim 1 wherein the bootstrapping operations are performed as part of booting the executing software program and include loading data on the host computing system that is specific to a user of the software execution service who supplied the received instructions, and wherein continuing the executing of the software program includes using the loaded data.

7. The computer-implemented method of claim 1 wherein the software program is created by a first entity, wherein the bootstrap package is created by a distinct second entity unaffiliated with the first entity and has one or more associated fees for use specified by the second entity, and wherein the method further comprises determining and indicating payment owed for use of the bootstrap package with the software program based at least in part on the one or more associated fees.

8. The computer-implemented method of claim 1 wherein the defined file system on the host computing system includes a hierarchical file system tree structure, and wherein the incorporating of the distinct file system used by the bootstrap package includes adding a sub-tree file system structure for the distinct file system within the hierarchical file system tree structure of the defined file system.

9. The computer-implemented method of claim 8 further comprising, after the completion of the performance of the bootstrapping operations, removing the added sub-tree file system structure from the defined file system on the host computing system.

10. The computer-implemented method of claim 1 wherein the bootstrap package includes a first bootstrap program, wherein the loading of the bootstrap package includes loading and executing the first bootstrap program on the host computing system and further includes initiating loading and executing of one or more additional second bootstrap programs that are distinct from the first bootstrap program, and wherein the executing of the one or more additional second bootstrap programs performs additional bootstrapping operations for the executing software program.

11. The computer-implemented method of claim 10 wherein the executing of the first bootstrap program includes using conditional logic to determine whether to execute at least one of the one or more additional second bootstrap programs based on current conditions.

12. The computer-implemented method of claim 10 wherein the performing of the bootstrapping operations by the executing first bootstrap program includes verifying that one or more security conditions are satisfied, and wherein the executing of the one or more additional second bootstrap programs is performed based on the one or more security conditions being verified to be satisfied.

13. The computer-implemented method of claim 10 wherein the performing of the bootstrapping operations by the executing first bootstrap program includes implementing performance testing to determine if one or more indicated capabilities are available on the host computing system, and wherein the executing of the one or more additional second bootstrap programs is performed based on the implemented performance testing indicating that the one or more indicated capabilities are available.

14. The computer-implemented method of claim 1 wherein the receiving of the instructions includes receiving, from a user of the software execution service, bootstrap instructions for use with the software program that identify the associated bootstrap package.

15. The computer-implemented method of claim 1 wherein the bootstrap package includes multiple alternative versions that each corresponds to a distinct operating system, and wherein the loading of the bootstrap package further includes selecting one of the multiple alternative versions to use for the performance of the bootstrapping operations for the executing software program.

16. A non-transitory computer-readable medium having stored contents that cause a computing system to:
receive, by the computing system, instructions to execute an indicated software program with an associated bootstrap package that performs bootstrap operations for the software program;
initiate, by the computing system, executing of the software program on a host computing system and loading of the bootstrap package to cause performance of the bootstrapping operations for the software program, wherein the executing software program uses a defined file system on the host computing system, and wherein the bootstrapping operations include incorporating a distinct file system for the bootstrap package into the defined file system on the host computing system; and
after completion of the performance of the bootstrapping operations, continue executing the software program on the host computing system using the defined file system.

17. The non-transitory computer-readable medium of claim 16 wherein the software program is a software image that includes the defined file system and operating system software and software for at least one application program, wherein the executing of the software program on the host computing system includes installing the defined file system on the host computing system and executing the operating system software and the software for the at least one application program, and wherein the bootstrap package is a bootstrap software image that is separate from the software program and that includes a distinct file system that is not part of the defined file system.

18. The non-transitory computer-readable medium of claim 16 wherein the loading of the bootstrap package includes executing a first bootstrap program on the host computing system and includes using the executing first bootstrap program to initiate loading and executing of one or more additional second bootstrap programs that are distinct from the first bootstrap program, and wherein the executing one or more additional second bootstrap programs perform additional bootstrapping operations for the executing software program.

19. The non-transitory computer-readable medium of claim 18 wherein the stored contents include software instructions of a software execution service that, when executed, initiate execution of conditional logic associated with the first bootstrap program to determine whether to execute at least one of the one or more additional second bootstrap programs, and wherein the execution of the conditional logic includes verifying that one or more security conditions are satisfied or implementing performance testing to determine that one or more indicated capabilities are available on the host computing system for use as part of the executing of the at least one additional second bootstrap program.

20. A computing system comprising:
one or more hardware processors; and
one or more modules that, when executed by at least one of the one or more hardware processors, configure the computing system to:
receive instructions to execute a bootstrap package that performs bootstrap operations for an indicated software program;
initiate executing of the software program and the bootstrap package on a host computing system to cause performance of the bootstrapping operations for the software program, wherein the executing software program uses a defined file system on the host computing system, and wherein the bootstrapping operations include incorporating a distinct file system for the bootstrap package into the defined file system on the host computing system; and
after completion of the performance of the bootstrapping operations, continue executing the software program on the host computing system using the defined file system.

21. The computing system of claim 20 wherein the software program is a software image that includes the defined file system and operating system software and software for at least one application program, wherein the executing of the software program on the host computing system includes installing the defined file system on the host computing system and executing the operating system software and the software for the at least one application program, and wherein the bootstrap package is a bootstrap software image that is separate from the software program and that includes a distinct file system.

22. The computing system of claim 20 wherein the executing of the bootstrap package includes loading and executing a first bootstrap program on the host computing system and includes initiating loading and executing of one or more additional second bootstrap programs that are distinct from the first bootstrap program, and wherein the executing of the one or more additional second bootstrap programs performs additional bootstrapping operations for the executing software program.

23. The computing system of claim 22 wherein the one or more modules include software instructions of a software execution service that, when executed, initiate execution of conditional logic associated with the first bootstrap program to determine whether to execute at least one of the one or more additional second bootstrap programs, and wherein the execution of the conditional logic includes verifying that one or more security conditions are satisfied or implementing performance testing to determine that one or more indicated capabilities are available on the host computing system for use for the executing of the at least one additional second bootstrap program.

* * * * *